United States Patent [19]

Fales

[11] 4,163,619
[45] Aug. 7, 1979

[54] CORRUGATED DRAINAGE TUBING WITH HELICALLY ARRANGED DRAINAGE OPENINGS

[75] Inventor: David E. Fales, Springfield, Ill.

[73] Assignee: Rainer Isolierrohrfabrik Max Drossbach, Fed. Rep. of Germany

[21] Appl. No.: 838,367

[22] Filed: Sep. 30, 1977

[51] Int. Cl.² .............................................. E02B 11/00
[52] U.S. Cl. ...................................... 405/49; 138/103; 138/121; 138/122; 138/177
[58] Field of Search ............... 138/103, 121, 122, 177, 138/178; 61/10, 11; 405/49

[56] References Cited

U.S. PATENT DOCUMENTS

| | | | |
|---|---|---|---|
| 980,442 | 1/1911 | Schlafly | 61/10 |
| 1,105,539 | 7/1914 | Smith | 138/178 X |
| 1,759,330 | 5/1930 | Van Horne | 138/103 X |
| 2,009,163 | 7/1935 | Chesley | 61/10 |
| 2,054,703 | 9/1936 | Little et al. | 138/103 X |
| 2,143,072 | 1/1939 | Johnson | 61/10 |
| 3,374,634 | 3/1968 | Fochler | 61/10 |
| 3,440,822 | 4/1969 | Hegler | 61/10 |
| 3,537,514 | 11/1970 | Levedahl | 138/178 X |
| 3,681,925 | 8/1972 | Schmunk et al. | 61/11 |
| 3,699,684 | 10/1972 | Sixt | 138/121 X |
| 3,753,352 | 8/1973 | McNally | 138/178 X |
| 3,820,340 | 6/1974 | Jenner et al. | 138/178 X |
| 3,830,373 | 8/1974 | Sixt | 61/11 X |
| 3,980,104 | 9/1976 | Kabai | 138/177 X |
| 4,024,894 | 5/1977 | Drossbach | 138/121 |

Primary Examiner—Richard E. Aegerter
Assistant Examiner—James E. Bryant, III

[57] ABSTRACT

A thermoplastic corrugated drainage tube comprising annular peaks and valleys and a plurality of drainage openings internally cut about the circumference of each valley, the openings in each valley aligned with the openings in successive valleys along helical lines described by said openings. The method of forming the drainage openings comprises placing a cutting tool in the interior of the tubing and rotating the tool while moving the tubing axially past the tool. The cutting tool comprises a body having a plurality of radially projecting cutters spaced equidistantly about the cutter body and means for rotating the tool.

7 Claims, 6 Drawing Figures

CORRUGATED DRAINAGE TUBING WITH HELICALLY ARRANGED DRAINAGE OPENINGS

This invention relates to thermoplastic drainage tubing comprising peaks and valleys having drainage openings internally cut in the bases of the valleys and to a method and apparatus for internally cutting the drainage openings in the tubing.

Drainage tubing of corrugated plastic having drainage openings in the bases of the annular, corrugation valleys is widely used, particularly in agriculture. The formation of the drainage openings, particularly if cut internally in a manner reducing the height of the corrugation walls, tends to weaken the tubing. Expedients to minimize this strength reduction include limiting the number of drainage openings in each valley or providing openings only in valleys spaced by unperforated valleys. Such expedients, however, tend to limit the open area provided by the drainage openings or provide an uneven distribution of the openings about the tubing circumference.

It is, accordingly, an object of the present invention to provide internally cut drainage tubing having a large open area provided by closely spaced drainage openings distributed about the circumference of the tubing which tubing is not significantly reduced in strength by the drainage openings.

In general, the invention features corrugated thermoplastic tubing having alternating peaks and valleys with drainage openings formed in the bases of the valleys. A like plurality of spaced drainage openings is provided about the circumference of each valley and the openings in each valley are axially and circumferentially offset by tubing wall material from the nearest adjacent openings in adjacent successive valleys and define a plurality of arrays of openings extending along helical lines at an acute angle, in the range of 14°–37°, to the longitudinal tubing axis. Each opening is axially spaced from the openings of each adjacent helical array for an axial distance comprising a plurality of valleys.

In a preferred embodiment the openings are equidistantly spaced. The helical lines describe one revolution about the tubing surface in a lineal distance equal to from 4–12 times the tubing diameter. In a preferred embodiment the helical lines describe one revolution in three feet to one meter for tubing up to 8 inches in diameter. In the described embodiment the wall height is reduced by internal cuts forming the openings.

Other objects, features and advantages of this invention will be apparent to those skilled in the art from the following detailed description of a preferred embodiment thereof, taken together with the accompanying drawings in which.

Figure 1:
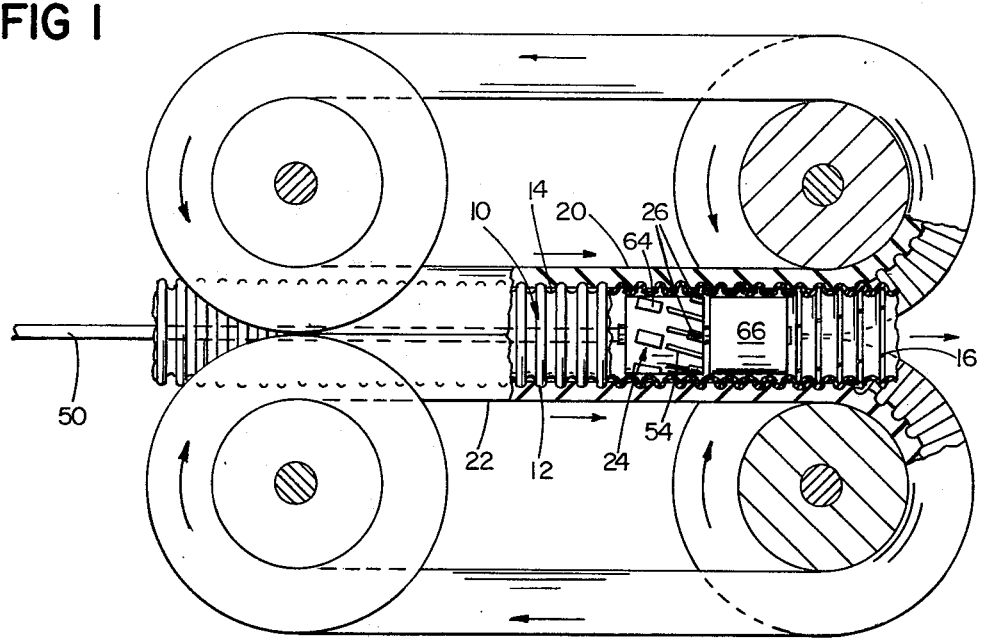
FIG. 1 is a side elevation, partly in section, of apparatus including a cutting tool for cutting the drainage openings in the illustrated corrugated tubing.
Figure 4:
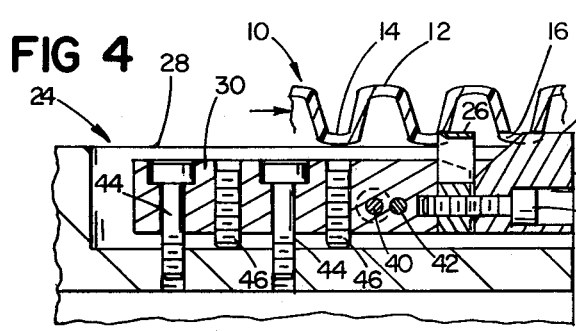
FIG. 4 is a developed sectional view taken along the line 4—4 of FIG. 2.
Figure 5:
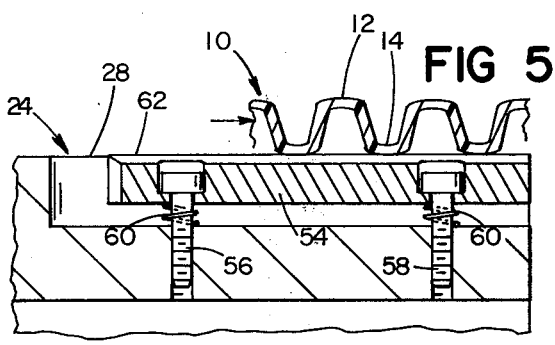
FIG. 5 is a developed sectional view taken along the line 5—5 of FIG. 2.
Figure 6:
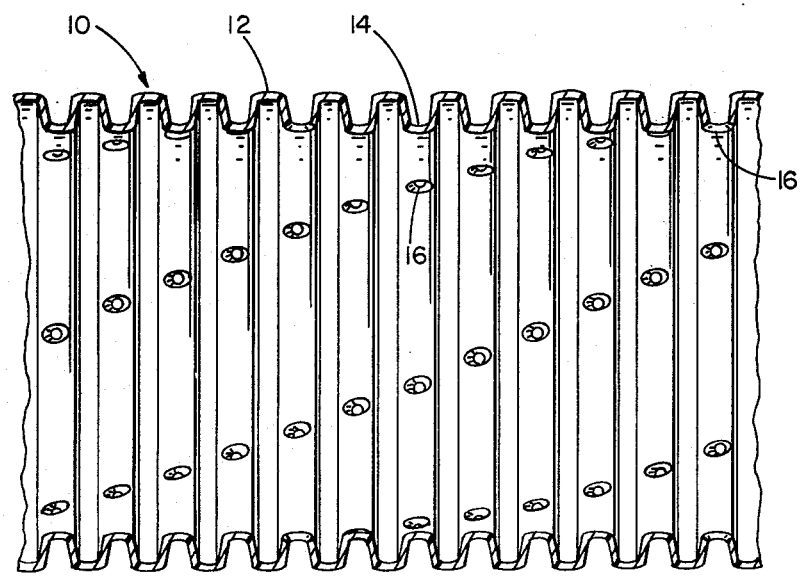
FIG. 6 is a reduced sectional view of tubing made according to the present invention.

As shown in FIG. 1, corrugated tubing 10, comprising alternate annular peaks 12 and valleys 14, is drawn by corrugated belts 20,22 through apparatus for internally cutting drainage openings 16 in the bases of the valleys 14. Belts 20,22 have the corrugations spaced from the bottoms of the tubing corrugations to avoid damage as drainage openings are cut. Alternatively, the belts may be uncorrugated. The apparatus includes a cutting tool 24 having a plurality, six in one embodiment, of cutters 26 equidistantly spaced thereabout and projecting radially outwardly to engage the valley bases and cut the drainage openings 16 as tubing 10 is drawn through the apparatus. As shown in FIGS. 4 and 6, the cutting of the drainage openings 16 reduces the height of the walls extending between the peaks 12 and valleys 14 of the tubing, a factor potentially contributing to weakening of the tubing.

To avoid significant weakening of the tubing, the openings are helically arranged along the tubing. This is accomplished by rotating the cutting tool 24 as the tubing 10 is drawn axially through the cutting apparatus. For tubing having a range of diameters from 3–8 inches and employing six cutters 26, the tool 24 is rotated once over a linear distance of about three feet or one meter of tubing length, i.e., a distance in the range of about 4–12 times the tubing diameter as the tubing is moved past the cutting tool 24. The angle of the helix to the tubing axis is preferably in the range of about 14°–37°.

Figure 2:
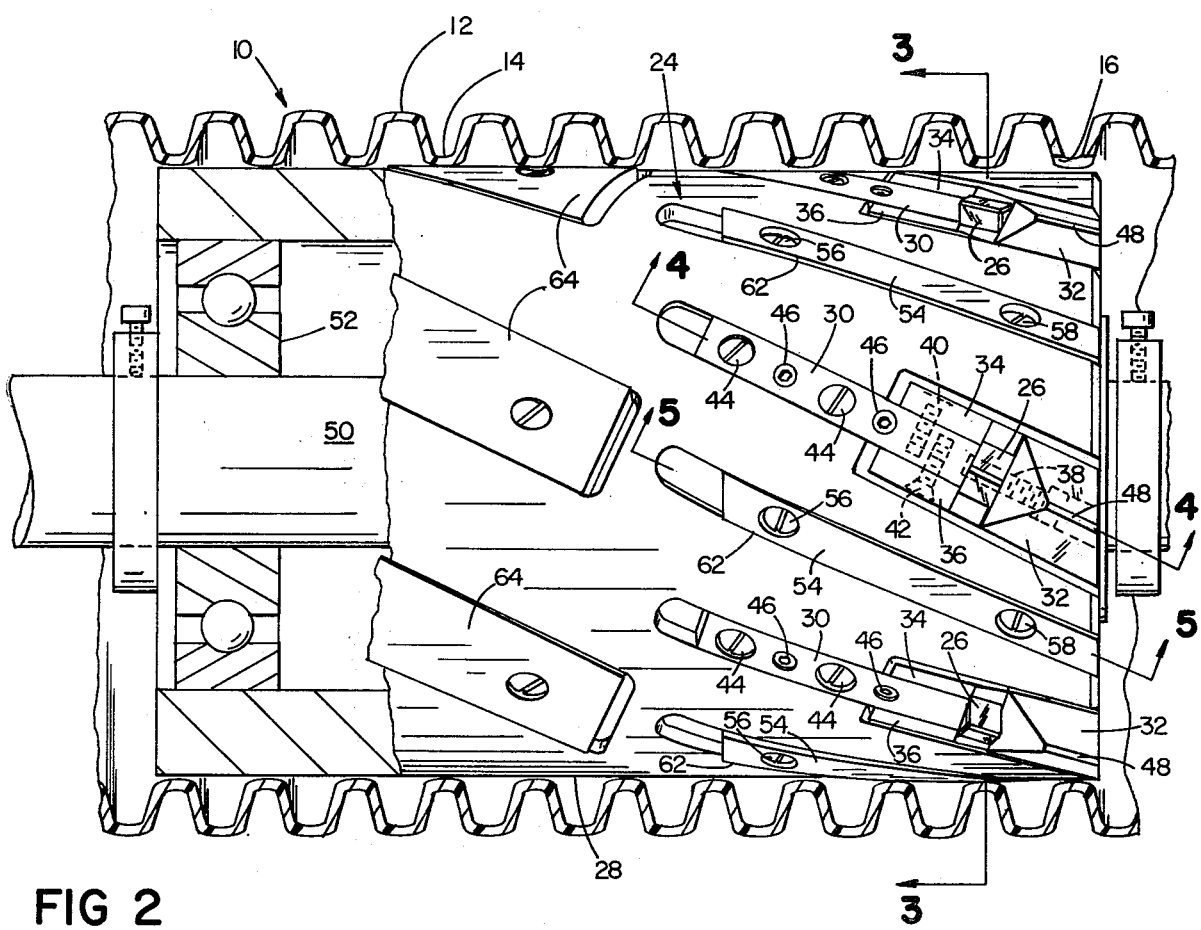
FIG. 2 is an enlarged side elevation partly in section of the cutting tool and the tubing illustrated in FIG. 1.
Figure 3:
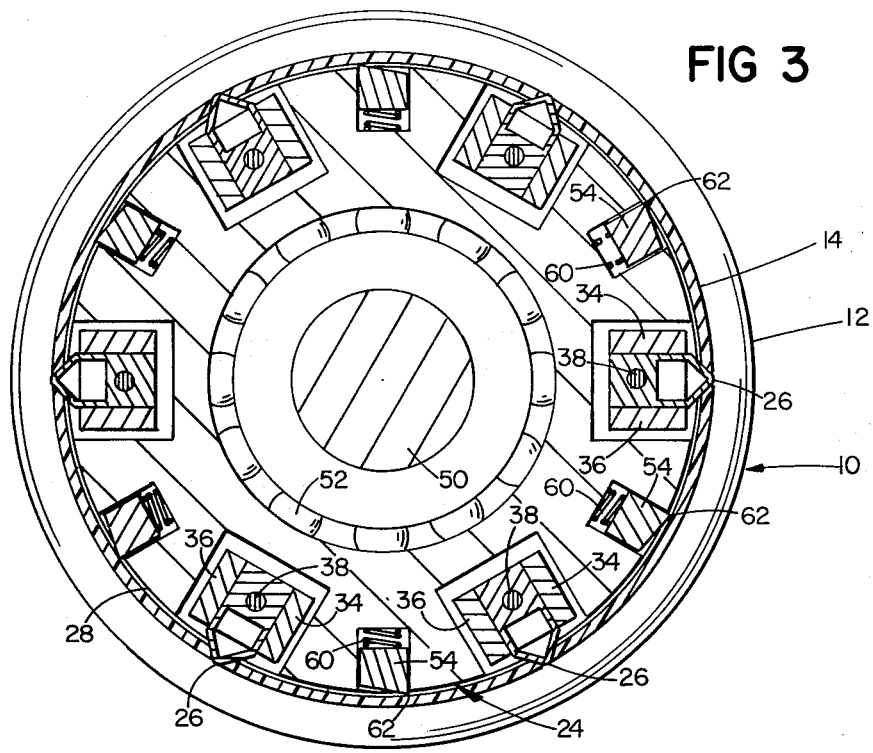
FIG. 3 is a sectional view taken along the line 3—3 of FIG. 2.

The cutting tool 24 is shown in greater detail in FIGS. 2–5. The tool 24 comprises a body 28 having a cylindrical surface with a diameter nearly equal to the internal diameter of the tubing 10. The cutters 26 are hollow, thin-walled and open-ended in a helical direction at the cutting portion to facilitate chip removal, and are secured to body 28, near the trailing portion of the body defined by the direction of tubing movement, at the desired helical angle by fixtures 30 recessed in the body 28, the cutters projecting radially a distance just sufficient to cut through the bases of the tubing valleys. As shown in FIGS. 2 and 4, the cutters 28 are fastened to fixtures 30 by clamps 32, 34 and 36 and by associated fasteners 38, 40 and 42. Fixtures 30 are fastened to body 28 by fasteners 44 and set screws 46 are provided for adjustment of the height of the cutters. The cutters 26 are flat on their tops, minimizing height reduction of the corrugated walls as the drainage openings are cut. Clamp 32 tapers upwardly to the height of the cutters 26 forming a post 48 to engage the openings previously cut and to support the tubing at the openings as the cutters form the next openings as shown best in FIGS. 2 and 4.

The tool 24 is supported on shaft 50. Although the tool may be rotated by a motor (not shown), in the illustrated preferred embodiment, the tool is rotated by frictional engagement with the tubing. The body is rotatably supported by bearings 52 (one shown) on the shaft. A plurality of guide members 54 is equidistantly spaced about the body 28 recessed therein, secured by fasteners 56,58 and biased outwardly by springs 60 between the guides 54 and body 28, best shown in FIGS. 3 and 5. The edge 62 of the guides angled forward, projects radially slightly above the surface of the body to firmly engage the tubing as it moves axially relative to the tool 24. The guides 54 are set at the helical angle desired, between about 14° and 37°, parallel to the cutters 26. The guides 54 have a length spanning a distance equal to a plurality of the valleys of the tubing 10 and thus as the tubing is moved axially, the engagement with guides 54 causes the tool to rotate as the cutters 26 form the drainage openings in the tubing.

Teflon pads 64, spring loaded outwardly (not shown) are mounted ahead of guides 54 about the body circumference to engage the tubing interior ahead of the cutters and a separate stationary metal cylinder 66 is attached to shaft 50 behind tool 24 also engaging the tube interior. The pads 64 and cylinder 66 hold the tubing in a circular shape ahead of and behind the cutters to facilitate accurate cutting, pads 64 having a low coefficient of friction so as not to impede tool rotation. The friction between cylinder 66 and the tubing resists any tendency of the tubing to rotate.

The resultant tubing 10 is best illustrated in FIG. 6. The tubing comprises organic thermoplastic material such as polyethylene or polyvinylchloride. As shown, a like plurality of equidistantly spaced drainage openings are located in the base of each valley 14. Each set of openings 16 in one valley is axially offset from the openings 14 of adjacent sets by the tubing material defining the walls and peaks 12 between adjacent valleys 14. Additionally, the openings 16 in each valley 14 each lie in separate arrays of openings on helical lines defined by the nearest adjacent openings 16 in successive adjacent valleys, the helix having an angle to the tubing axis in the range of 14°-37° as above described. The nearest adjacent openings in successive valleys are thus also circumferentially offset with tubing material between the adjacent edges of helically adjacent openings and each opening is axially aligned with tubing material over a substantial distance comprising a plurality of peaks and valleys. The helix adjacent that in which one opening lies, crosses an axial line extending from such opening only at such distance.

In a particular embodiment, the tubing has a 3 inch diameter and the valleys are spaced about 7/16 inch apart. Six drainage openings are cut in each valley, spaced equidistantly about the tubing circumference, the openings lying in helical rows. The holes have dimensions of about 1/16 to 1/8 inch by ¼ to 3/16 inch and have collectively an open area of 2.96 inches per linear foot of tubing, i.e., about 2.62% of the tubing surface area. The angle of the helical lines of the openings to the tubing axis is about 14°, describing one revolution in about three feet to one meter. The strength of the tube, as a result, is only about 5% less than an unperforated tube compared to about a 25% weakening of a tube with openings cut in a linear direction.

Advantageously, therefore, the tubing is provided with substantial open area with minimal reduction in strength. Additionally, each valley is provided with a plurality of openings about the circumference of the tube facilitating entry of water on all sides of the tube.

The method and the tool provide a simple economical manner of forming the openings. The tool cutting the openings while they are supported, provides clean, accurate cuts minimizing rough scrap which might form sites for bacterial growth which might tend to obstruct the holes. The frictional rotation of the tool simplifies the design and minimizes cost of the apparatus.

Other embodiments of this invention will occur to those skilled in the art which are within the scope of the following claims.

What is claimed is:

1. Corrugated drainage tubing of organic thermoplastic material comprising a tubular wall of alternating peaks and valleys and a plurality of drainage openings in the valleys, characterized in that a like plurality of spaced drainage openings are provided about the circumference of each valley in the base thereof, the drainage openings in each valley are axially and circumferentially offset of wall material from the nearest adjacent drainage opening in adjacent valleys and, together with the nearest adjacent drainage openings in successive adjacent valleys, form a plurality of arrays of drainage openings extending along parallel helical lines at an acute angle in the range of about 14°-37° to the longitudinal tubing axis, and each said drainage opening is axially spaced by wall material from each adjacent helical array and the drainage openings of each said adjacent helical array for an axial distance comprising a plurality of valleys.

2. The drainage tubing claimed in claim 1 further characterized in that each helical line extending from one said opening in one valley first crosses an axial line, extending from the opening in said one valley adjacent said one opening in the direction toward which said helical line extends, at said axial distance.

3. The drainage tubing claimed in claim 2 further characterized in that said openings are internally cut along said helical lines and the wall material extending from said valleys to said peaks is thereby reduced in height at said openings relative to wall material adjacent said openings.

4. The drainage tubing claimed in claim 3 further characterized in that said openings in each valley are equidistantly spaced from each other.

5. The drainage tubing claimed in claim 4 further characterized in that said tubing comprises annular peaks and valleys.

6. The drainage tubing claimed in claim 2 further characterized in that said helical lines of openings describe one revolution about the surface of said tubing in a lineal distance along said tubing in the range of 4 to 12 times the tubing diameter.

7. The drainage tubing claimed in claim 2 further characterized in that said tubing has a diameter up to 8 inches and said helical lines describe one revolution about the tubing surface in about 3 feet to 1 meter of axial length of the tubing.

* * * * *